(12) United States Patent
Patel et al.

(10) Patent No.: US 9,207,940 B2
(45) Date of Patent: Dec. 8, 2015

(54) ROBUST AND HIGH PERFORMANCE INSTRUCTIONS FOR SYSTEM CALL

(71) Applicants: Baiju V. Patel, Portland, OR (US); James B. Crossland, Banks, OR (US); Atul A. Khare, Portland, OR (US); Toby Opferman, Hillsboro, OR (US)

(72) Inventors: Baiju V. Patel, Portland, OR (US); James B. Crossland, Banks, OR (US); Atul A. Khare, Portland, OR (US); Toby Opferman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 13/837,878

(22) Filed: Mar. 15, 2013

(65) Prior Publication Data

US 2014/0281437 A1   Sep. 18, 2014

(51) Int. Cl.
*G06F 9/30* (2006.01)
*G06F 9/00* (2006.01)

(52) U.S. Cl.
CPC .................................. *G06F 9/30145* (2013.01)

(58) Field of Classification Search
None
See application file for complete search history.

(56) References Cited

U.S. PATENT DOCUMENTS

2010/0313201 A1\* 12/2010 Warton et al. ..................... 718/1

\* cited by examiner

*Primary Examiner* — Scott Sun
(74) *Attorney, Agent, or Firm* — Nicholson De Vos Webster & Elliott LLP

(57) ABSTRACT

Robust system call and system return instructions are executed by a processor to transfer control between a requester and an operating system kernel. The processor includes execution circuitry and registers that store pointers to data structures in memory. The execution circuitry receives a system call instruction from a requester to transfer control from a first privilege level of the requester to a second privilege level of an operating system kernel. In response, the execution circuitry swaps the data structures that are pointed to by the registers between the requester and the operating system kernel in one atomic transition.

20 Claims, 15 Drawing Sheets

600

RECEIVE A SYSTEM CALL INSTRUCTION FROM A REQUESTER TO TRANSFER CONTROL FROM A FIRST PRIVILEGE LEVEL OF THE REQUESTER TO A SECOND PRIVILEGE LEVEL OF AN OPERATING SYSTEM KERNEL
611

RESPONSIVE TO THE SYSTEM CALL INSTRUCTION, SWAP DATA STRUCTURES THAT ARE POINTED TO BY ONE OR MORE OF THE REGISTERS BETWEEN THE REQUESTOR AND THE OPERATING SYSTEM KERNEL IN ONE ATOMIC TRANSITION
612

RBSTCALL(1): Input Registers: None; Output Registers: None

- o  If CS.L != Long Mode or IA32_EFER.LMA != Long Mode or          410
  IA32_EFER.SCE != enabled
  //* If not in a 64-bit code segment or 64-bit mode is not enabled or the
  RBSTCALL/RBSTRET instructions are not enabled, generate a fault *//
  - Fault (e.g., #UD or #GP)

- o  Else If CPL = 0 //* If current privilege level is 0, stay in level 0 *//
  - Verifications (if fails, Fault (e.g., #UD or #GP))                420
  - MSR_CPL0_RPL0_RIP
  //* fault #GP on non-canonical destination address *//
  - Temp_RSP ← RSP                                                   425
  //* Force RSP to 64-bit alignment to mitigate risk of unaligned stack *//
  - [RSP+8]    ← SS
  - [RSP+0x10] ← Temp_RSP
  - [RSP+0x18] ← RFLAGS
  - [RSP+0x20] ← CS
  - [RSP+0x28] ← RIP
  - RIP = MSR_CPL0_RPL0_RIP
  - RSP = RSP + 0x28

- o  Else //* CPL != 0: If current privilege level is 0 *//
  - Verifications //* Additional checks may also be performed *//     430
  - MSR_CPLx_RPL0_RIP //* Fault #GP on non-canonical address *//
  - MSR_CPLx_RPL0_CS //* Fault #GP on invalid CS *//
  - MSR_CPLx_RPL0_RSP //* Fault #GP on non-canonical address *//
  - MSR_CPLx_RPL0_SS //* Fault #GP on Invalid SS *//
  - TempSS  ← SS                                                      435
  - TempRSP ← RSP
  //* Force RSP to 64-byte alignment to mitigate risk of unaligned stack *//
  - EFlags_Temp ← EFLAGS;
  - EFLAGS ← (EFLAGS MASKED BY MSR_CPLx_RPL0_FLAGSMASK);
  - CPL ← 0 //* CPL changed to target privilege level = 0 *//
  - TempGS ← GS_BASE;
  - GS_BASE ← KernelGSBase;
  - KernelGSBase ← TempGS;R
  //* Swap control stacks between the OS and the requestor *//
  - SS = MSR_CPLx_RPL0_SS
  - RSP = MSR_CPLx_RPL0_RSP
  - [RSP]    ← TempSS
  - [RSP+8]  ← TempRSP
  - [RSP+0x10] ← EFlags_Temp
  - [RSP+0x18] ← CS
  - [RSP+0x20] ← RIP
  - CS = MSR_CPL0_RPL0_CS
  - RIP = MSR_CPL0_RPL0_RIP
  - RSP = RSP + 0x20

FIG. 4A

RBSRET(1): Input Registers: None; Output Registers: None o    If CS.L != Long Mode or IA32_EFER.LMA != Long Mode or          440
IA32_EFER.SCE != enabled or CPL != 0
//* If not in a 64-bit code segment or 64-bit mode is not enabled or the
RBSTCALL/RBSTRET instructions are not enabled or the current privilege
level is not zero, generate a fault *//
■    Fault (e.g., #UD or #GP)

o    Verifications //* if fails, Fault (e.g., #UD or #GP) *//          450
■    [RSP] //* Fault #GP on non-canonical (RIP) *//
■    [RSP + 0x18] //* Fault #GP on non-canonical (RSP) *//
■    [RSP+0x8] (CS) and [RSP+0x20] (SS) //* check for invalid
segment in some embodiments *// o    RIP ← [RSP]                                                       460
o    Temp_CS ← [RSP + 0x8]
o    RFLAGS ← [RSP + 0x10]
o    RSP ← [RSP + 0x18]
o    SS ← [RSP + 0x20]

o    If Temp_CS. RPL != 0  //* if requestor's privilege level is not 0 *//
■    TempGS = GS_BASE                                                  470
■    GS_BASE = KernelGSBase
■    KernelGSBase = TempGS
//* Swap control stacks between the OS and the requestor *//
■    CPL ← Temp_CS.RPL
//* set the current privilege level to be the requestor's privilege level *//
o    CS ← Temp_CS

FIG. 4B

RBSTCALL(2)
- Input Registers: None
- Output Registers:
  - RCX – RIP of the instruction following RBSTCALL
  - R10 – RSP at time of RBSTCALL
  - R11 – Lower 32 bits of RFLAGS

- IF (CS.L ≠ 1) or (IA32_EFER.LMA ≠ 1) or (IA32_EFER.SCE ≠ 1)
//* If not in 64-Bit Mode or SYSCALL/SYSRET not enabled, generate a fault *//
  - THEN #UD; FI;

- RCX ← RIP;
- RIP ← LSTAR_MSR;
- R10 ← RSP;
- R11 ← EFLAGS;
- EFLAGS ← (EFLAGS MASKED BY IA32_FMASK);
- CPL ← 0;

- TempGS ← GS_BASE;
- GS_BASE ← KernelGSBase;
- KernelGSBase ← TempGS;
//* Swap control stacks between the OS and the requestor *//

- CS(SEL) ← IA32_STAR_MSR[47:32];
- CS(DPL) ← 0;
- CS(BASE) ← 0;
- CS(LIMIT) ← 0xFFFFF;
- CS(GRANULAR) ← 1;
//* Set up current code segment for use in the kernel in 64-bit mode *//

- SS(SEL) ← IA32_STAR_MSR[47:32] + 8;
- SS(DPL) ← 0;
- SS(BASE) ← 0;
- SS(LIMIT) ← 0xFFFFF;
- SS(GRANULAR) ← 1;
//* Set up current stack segment for use in the kernel in 64-bit mode *//

FIG. 5A

RBSRET(1): Input Registers: None; Output Registers: None o    If CS.L != Long Mode or IA32_EFER.LMA != Long Mode or IA32_EFER.SCE != enabled or CPL != 0
//* If not in a 64-bit code segment or 64-bit mode is not enabled or the RBSTCALL/RBSTRET instructions are not enabled or the current privilege level is not zero, generate a fault *//
▪    Fault (e.g., #UD or #GP)

o    Verifications  //* if fails, Fault (e.g., #UD or #GP) *//
▪    [RSP] //* Fault #GP on non-canonical (RIP) *//
▪    [RSP + 0x18] //* Fault #GP on non-canonical (RSP) *//
▪    [RSP+0x8] (CS) and [RSP+0x20] (SS) //* check for invalid segment in some embodiments *// o    RIP ← [RSP]
o    Temp_CS ← [RSP + 0x8]
o    RFLAGS ← [RSP + 0x10]
o    RSP ← [RSP + 0x18]
o    SS ← [RSP + 0x20]

o    If Temp_CS. RPL != 0
▪    TempGS = GS_BASE
▪    GS_BASE = KernelGSBase
▪    KernelGSBase = TempGS
//* Swap control stacks between the OS and the requestor *//

▪    CPL ← Temp_CS.RPL
//* set the current privilege level to be the requestor's privilege level *//
o    CS ← Temp_CS

FIG. 5B

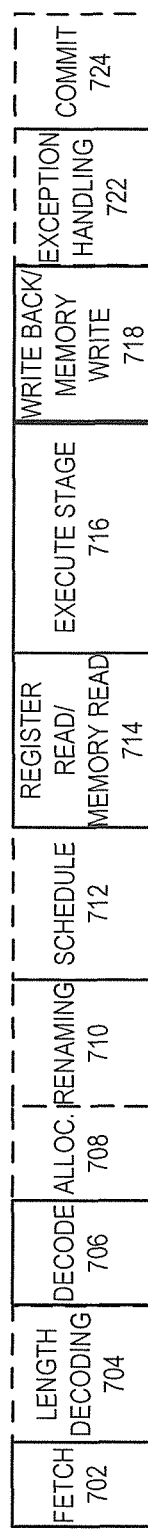
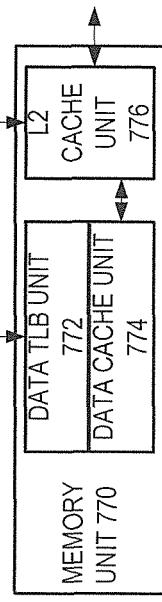
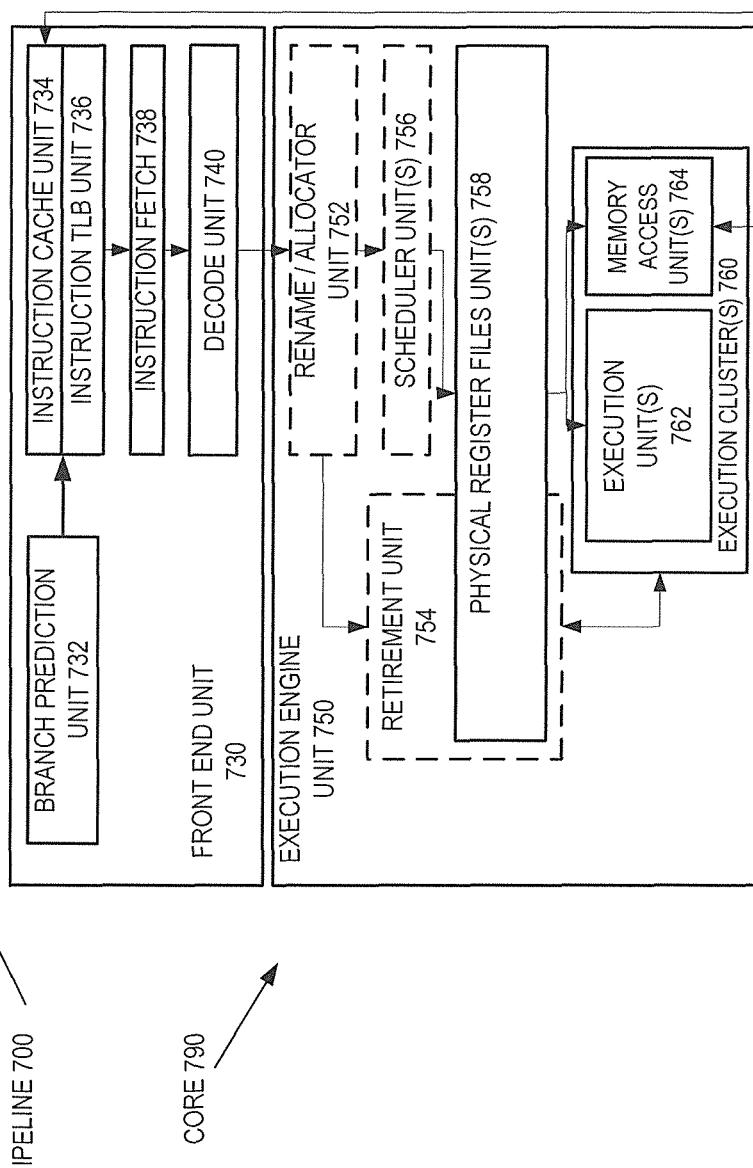
FIG. 7A
FIG. 7B

ROBUST AND HIGH PERFORMANCE INSTRUCTIONS FOR SYSTEM CALL

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism, etc.

An ISA typically provides one or more instructions for an application program to make a system call. Via the system call, an application program can request a service from an operating system kernel. The service includes hardware-related services (e.g., accessing the hard disk), creating and executing new processes, and communicating with integral kernel services (e.g., scheduling). Thus, system calls provide an interface between an application program and the operating system kernel.

Typically, system calls are implemented with a software interrupt or trap. Interrupts transfer control from an application program to the operating system kernel. Some existing architectures provide control transfer instructions for making a system call. These control transfer instructions are designed for an application program to quickly transfer control to the operating system without the overhead of an interrupt. However, the existing control transfer instructions have significant weakness that is vulnerable to faults and attacks. This vulnerability leads to less robust software. For example, if a fault occurs during a system call or system return before the control stacks are switched, the fault handler in the operating system may execute with the user mode stack instead of the system stack. The user mode stack is non-privileged and untrusted. In some scenarios, the user mode stack may contain malicious code and executing with the user mode stack can expose the system to malicious attacks.

BRIEF DESCRIPTION OF THE DRAWINGS

Embodiments are illustrated by way of example and not limitation in the Figures of the accompanying drawings:

FIG. 4A illustrate an example of a first version of the RBSTCALL instruction according to one embodiment.

FIG. 4B illustrate an example of a first version of the RBSTRET instruction according to one embodiment.

FIG. 5A illustrate an example of a second version of the RBSTCALL instruction according to one embodiment.

FIG. 5B illustrate an example of a second version of the RBSTRET instruction according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments described herein may be practiced without these specific details. In other instances, well-known circuits, structures and techniques have not been shown in detail in order not to obscure the understanding of this description.

Embodiments described herein provide a set of control transfer instructions, each of which completes the transition between the supervisor mode and the user mode in one single atomic instruction. With the conventional system call and return mechanisms, it takes a sequence of instructions to complete the transition between the supervisor mode and the user mode. A fault in the middle of this conventional instruction sequence leads to execution in the supervisor mode with a non-supervisory state. The occurrence of such a fault typically leads to either system crashes, inability to recover from faults, or privilege escalation attacks.

As used herein, the term "supervisor mode" is also referred to as "privileged mode," "kernel mode," or "ring 0," and the term "user mode" is also referred to as "non-privileged mode," "non-supervisor mode" or "ring 3." Further, as used herein, a software entity's "privilege level" is the same as its ring level; e.g., a ring-3 program has a privilege level of 3. Although the transition between ring 0 and ring 3 are described in one or more of the following examples, it is appreciated that the new instructions described herein are applicable to transitions between any two different rings or between processes in the same ring.

According to one embodiment, the new instructions include "RBSTCALL" and "RBSTRET" instructions, where "RBST" stands for the word "robust." The RBSTCALL instruction is a system call instruction and the RBSTRET instruction is a system return instruction. These new instructions are robust against malicious attacks, and also have high performance.

Figure 1:
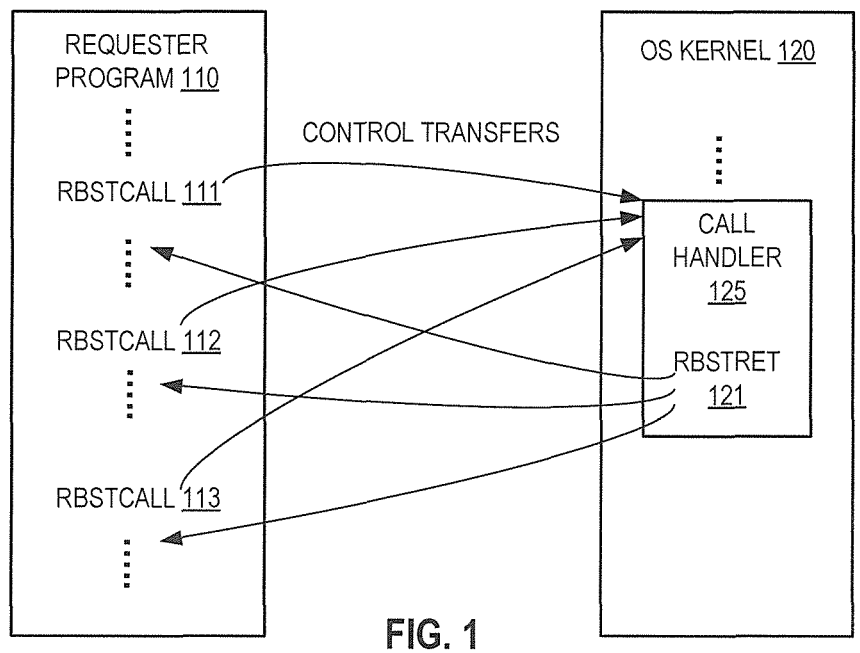
FIG. 1 is a block diagram illustrating control transfers according to one embodiment.

FIG. 1 illustrates an example of the control transfers that take place in response to the "RBSTCALL" and "RBSTRET" instructions. The RBSTCALL instruction is a non-privileged instruction and can be called by a requester program 110, which can be in ring 0, 1, 2 or 3. When a processor (e.g., a central processing unit (CPU) in a processing system) executes the RBSTCALL instruction in the requester program 110, control is transferred to a call handler 125 in an operating system (OS) kernel 120. The call handler 125 executes in ring 0. When the call handler 125 finishes the call handling, the processor executes the RBSTRET instruction in the OS 120 to return the control to the requester program 110. The RBSTRET instruction is a privileged instruction and can be only be called by ring-0 software such as the OS. In one embodiment, the execution of the "RBSTCALL" and "RBSTRET" instructions can be nested. For example, the execution may follow the sequence of: requester program 110→RBSTCALL 111→call handler 125→RBSTRET 121→requester program 110→RBSTCALL 112→call handler 125→RBSTRET 121→requester program 110→RBSTCALL 113→call handler 125→RBSTRET 121→requester program 110. Thus, each time the control is returned to the requester program 110, a code segment of the requester program 110 can be executed before the next system call.

An embodiment of the RBSTCALL instruction stores the contents of CS (code selector), RIP (instruction pointer) and RGLAGS on the kernel stack using a format similar to the interrupt and exception stack frames. The use of the format paves the path for easy reentrancy in the nested execution.

As mentioned before, the RBSTCALL instruction allow both intra-ring calls that originate from ring 0, as well as inter-ring calls originate from ring 1, 2 or 3. Similarly, the RBSTRET instruction allows ring-0 code to return to any ring (e.g., ring 0, 1, 2 or 3). Each of the RBSTCALL instruction and the RBSTRET instruction automatically loads a segment register (e.g., GS) with the correct selector value in case of a ring transition, thereby eliminating the window where a fault before the transfer completion can result in supervisor mode execution with non-supervisor state in the GS. Further, by restoring the target stack selector (e.g., SS) and/or the stack pointer (e.g., RSP) atomically, the RBSTRET instruction improves reliability by eliminating the window in which a kernel mode fault handler can execute with invalid SS and/or RSP.

Embodiments of the RBSTCALL and RBSTRET instructions perform sanity checks on the validity of the target selectors (e.g., CS and SS) on the kernel stack, and also perform canonical checks on validity of address format in the target RIP and RSP, thereby alerting the OS against potential corruptions. The canonical check of address format in the RIP is performed by checking whether the address loaded into the RIP falls into a non-canonical address range. This range exists because of the address range provided by the architecture (e.g., 64 bits) is greater than the address range in use (e.g., 48 bits). Thus, a region of the 64-bit address space is unused. This unused region allows future address space expansion. However, the unused region is a non-canonical address range and any address in the RIP that falls into that range is an invalid address. The canonical address checks can be performed after the RIP is loaded but before the address in the RIP is committed. The canonical address checks eliminates the address format vulnerabilities in RIP that can be exploited by malware. In some embodiments, the canonical address checks can be performed on other registers as well.

In some embodiments, the RBSTCALL and RBSTRET instructions can be optimized to be a fast version by removing most of the address and segment validations, and making assumptions about ring transitions; e.g., the target ring is zero. For example, the fast version does not validate the values in the Model-Specific Registers (MSRs) because the MSRs can only be loaded by the OS kernel. The fast version delivers most of the benefit of control transfers for substantially less cost.

Similar to the other versions of the RBSTCALL and RBSTRET instructions, the fast version retains the atomic feature in which the GS is automatically loaded with the correct selector value, thereby eliminating the window where a fault before the transfer completion can result in supervisor mode execution with non-supervisor mode GS. Similar to the other versions of the RBSTCALL and RBSTRET instructions, the fast version removes canonical RIP related vulnerabilities that can be exploited by malware. Further, similar to the other versions of the RBSTRET instructions, the fast version restores the target SS and/or RSP atomically, improving reliability by eliminating the window in which a kernel mode fault handler can execute with invalid SS and/or RSP. The RBSTCALL and RBSTRET instructions can be executed by an instruction processing apparatus as described below.

Figure 2:
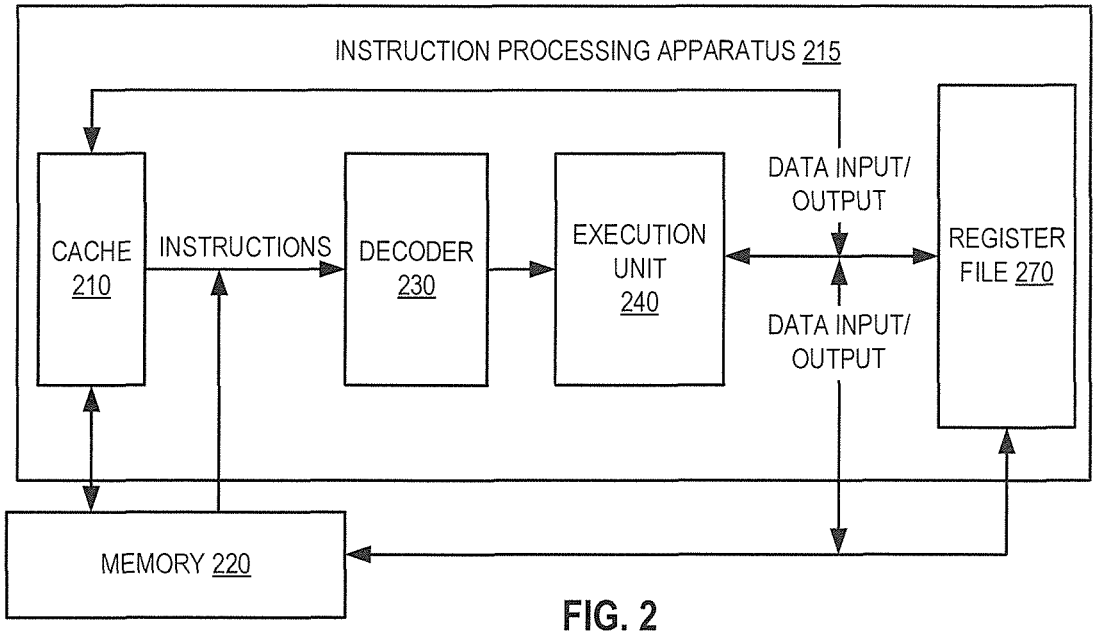
FIG. 2 is a block diagram of an instruction processing apparatus according to one embodiment.

FIG. 2 is a block diagram of an embodiment of an instruction processing apparatus 215 having an execution unit 240 that includes circuitry operable to execute instructions, including the RBSTCALL/RBSTRET instructions. In some embodiments, the instruction processing apparatus 215 may be a processor, a processor core of a multi-core processor, or a processing element in an electronic system.

A decoder 230 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 230 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The decoder 230 may receive incoming instructions for a cache 210, a memory 220 or other sources. The decoded instructions are sent to the execution unit 240. The execution unit 240 may receive from the decoder 230 one or more micro-operations, micro-code entry points, microinstructions, other instructions, or other control signals, which reflect, or are derived from the received instructions. The execution unit 240 receives data input from and generates data output to a register file 270, the cache 210, and/or the memory 220.

In one embodiment, the register file 270 includes architectural registers, which are also referred to as registers. Unless otherwise specified or clearly apparent, the phrases architectural registers, register file, and registers are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

To avoid obscuring the description, a relatively simple instruction processing apparatus 215 has been shown and described. It is to be appreciated that other embodiments may have more than one execution unit. For example, the apparatus 215 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 215 will be provided later with respect to FIGS. 7-13.

According to one embodiment, the register file 270 includes a set of registers that can be used by the RBSTCALL and RBSTRET instructions. Some of the registers can be used to store system state including pointers to segments and instructions. An example of a register file is described below with reference to FIG. 3.

Figure 3:
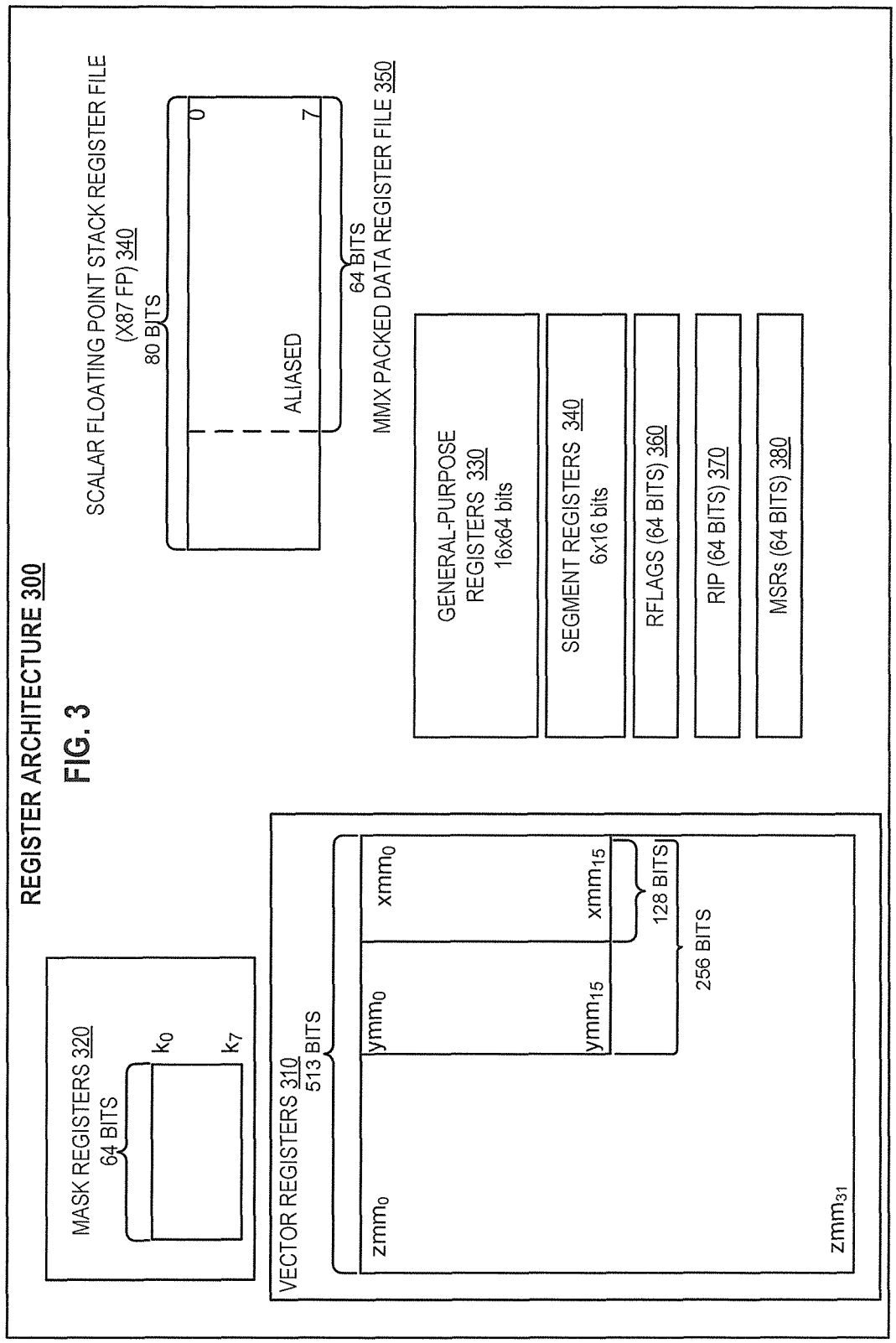
FIG. 3 is a block diagram of register architecture according to one embodiment.

FIG. 3 illustrates an embodiment of underlying register architecture 300 that supports the instructions described herein. The register architecture 300 is based on the Intel® Core™ processors implementing an instruction set including x86, MMX™, Streaming SIMD Extensions (SSE), SSE2, SSE3, SSE4.1, and SSE4.2 instructions, as well as an additional set of SIMD extensions, referred to the Advanced Vector Extensions (AVX) (AVX1, AVX2 and AVX3). However, it is understood different register architecture that supports different register lengths, different register types and/or different numbers of registers can also be used.

In the embodiment illustrated, there are thirty-two vector registers 310 that are 512 bits wide; these registers are referenced as zmm0 through zmm31. The lower order 256 bits of the lower sixteen zmm registers are overlaid on registers ymm0-16. The lower order 128 bits of the lower sixteen zmm registers (the lower order 128 bits of the ymm registers) are overlaid on registers xmm0-15. In the embodiment illustrated, there are eight mask registers 320 (k0 through k7), each 64 bits in length. In an alternate embodiment, the mask registers 320 are 16 bits width.

In the embodiment illustrated, the register architecture 300 further includes sixteen 64-bit general-purpose (GP) registers 330. In an embodiment these GP registers 330 are used along with the existing x86 addressing modes to address memory operands. The register architecture 300 also includes six 16-bit segment registers (CS: code selector, DS: data selector, SS: segment selector, ES: extra, FS and GS). The embodiment also illustrates an RFLAGS register 360, an RIP register 370 and Model-Specific Registers (MSRs) 380.

The embodiment also illustrates a scalar floating point (FP) stack register file (x87 stack) 340, on which is aliased the MMX packed integer flat register file 350. In the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and xmm registers.

Alternative embodiments may use wider or narrower registers. Additionally, alternative embodiments may use more, less, or different register files and registers.

FIG. 4A illustrate an example of a first version of the RBSTCALL instruction according to one embodiment. The RBSTCALL instruction transfers control from a requester to an OS kernel. In one embodiment, the RBSTCALL instruction includes a code block 410 to check whether the call is valid and enabled; if it is not valid or not enabled, a fault (e.g., a general protection (#GP fault) or an invalid opcode (#UD fault)) is generated. For example, a fault can be generated if the requester is not in a 64-bit code segment, or the 64-bit mode is not enabled, or the RBSTCALL and RBSTRET instructions are not enabled. In one embodiment, the RBSTCALL and RBSTRET instructions are enabled when a bit in one of the registers is set.

The RBSTCALL instruction can be called by a requester whose privilege level is zero (for an intra-ring call) or non-zero (for an inter-ring call). For both the intra-ring call and the inter-ring call, the processor executing the RBSTCALL instruction verifies address conformity (e.g., for RIP non-canonical address) in code blocks 420 and 430. In one embodiment, the processor executing the RBSTCALL instruction also verifies whether the segment registers CS and SS contain valid addresses in the code block 430. The RBSTCALL instruction further includes code blocks 425 and 435 (for the intra-ring call and inter-ring call, respectively) to perform the operations of control stack swapping between the OS kernel and the requester. The control stack herein refers to the data structures that are used by the operating system to keep track of the execution. These data structures are stored in memory and are pointed to by the segment registers CS, SS, GS, as well as the pointers RIP and RSP. Since the ring-0 data structures (e.g., the control stack associated with the OS kernel) differ from their ring-3 counterparts (e.g., the control stack associated with a user-mode program), it necessitates the use of a separate SWAPGS instruction immediately following the legacy SYSCALL/SYSRET instructions. The RBSTCALL (and similarly RBSTRET) instruction does not need any separate instructions to swap the pointers to the data structures between an OS kernel and the requester. The swapping operation is performed within the RBSTCALL/RBSTRET as a single atomic instruction. For the inter-ring call, the code block 435 loads the GS with the correct code selector value. Thus, it can be seen that within the RBSTCALL instruction, the control transfer is accomplished with verification and control stack swapping in one atomic instruction.

FIG. 4B illustrate an example of a first version of the RBSTRET instruction according to one embodiment. The RBSTRET instruction reverses the operations of the RBSTCALL instruction by returning control from the OS kernel to the requester (i.e., the requester of the RBSTCALL). The RBSTRET instruction is a privileged instruction; that is, it can only be called from ring 0. In this embodiment, the RBSTRET instruction includes a code block 440 to check whether the call is valid and enabled; if it is not valid or not enabled, a fault is generated (similar to the code block 410 of FIG. 4A). The processor executing the RBSTRET instruction verifies address conformity (e.g., for RIP and RSP non-canonical address formats) in a code block 450. In some embodiment, the processor executing the RBSTRET instruction also verifies whether the segment registers CS and SS contain valid addresses in the code block 450. The RBSTRET instruction further includes code blocks 460 and 470 to perform the operations of control stack swapping between the OS kernel and the requester. The code block 470 is executed if the requester's privilege level is non-zero (i.e., for an inter-ring call), where the GS is loaded with the correct code selector value. Thus, it can be seen that within the RBSTRET instruction, the control transfer is accomplished with verification and software stack swapping in one atomic instruction.

FIG. 5A and FIG. 5B illustrate an example of a second version of the RBSTCALL instruction and the RBSTRET instruction, respectively, according to one embodiment. The second version of the RBSTCALL and RBSTRET instructions is a fast version in that some of the verification performed in the first version (e.g., most of the address and segment validations) are removed. The fast version also makes assumptions about ring transitions (e.g., the target ring is ring 0, the code selector loaded into CS is a valid code segment, etc.). Further, in the fast version, it is assumed that the general registers RCX, R10, R11 are used as the output registers. Saving the output in these registers can improve the performance of the instructions and allow utilization of some of the existing microcode for system calls. In the fast version, correct values are loaded into the segment registers GS, CS and SS. It can be seen that within each of the RBSTCALL instruction and the RBSTRET instruction of the fast version, the control transfer is accomplished with verification and control stack swapping in one atomic instruction.

Figure 6A:
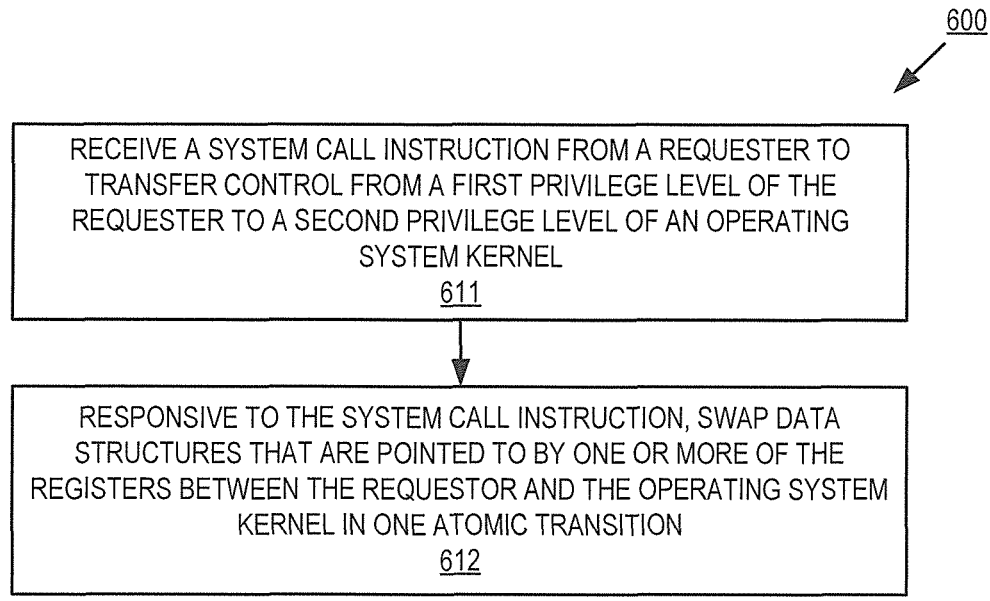
FIG. 6A is a flow diagram illustrating operations to be performed responsive to a RBSTCALL instruction according to one embodiment.
Figure 6B:
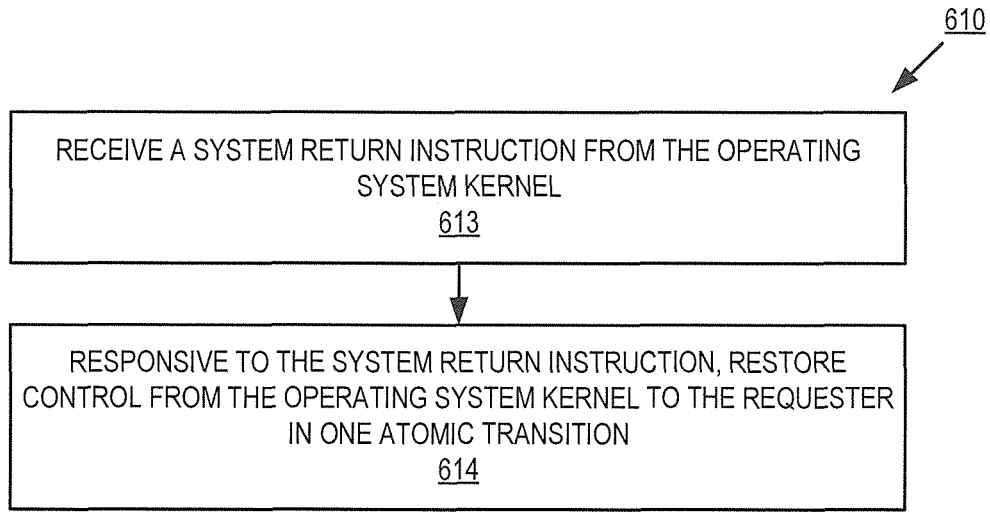
FIG. 6B is a flow diagram illustrating operations to be performed responsive to a RBSTRET instruction according to one embodiment.

FIG. 6A is a block flow diagram of a method 600 for executing a control transfer instruction (e.g., a RBSTCALL instruction) according to one embodiment. The method 600 begins with a processor receiving a system call instruction from a requester to transfer control from a first privilege level of the requester to a second privilege level of an OS kernel (block 611). Responsive to the system call instruction, the processor swaps data structures that are pointed to by one or more of the registers between the requester and the OS kernel in one atomic transition (block 612). FIG. 6B is a block flow diagram of a method 610 for executing a control transfer instruction (e.g., a RBSTRET instruction) according to one embodiment. The method 610 begins with a processor receiving a system return instruction from the OS kernel (block 613). Responsive to the system return instruction, the processor restores control from the OS kernel to the requester in one atomic transition (block 614).

In one embodiment, the first privilege level is the same as the second privilege level. In another embodiment, the first privilege level is in a non-supervisor mode and the second privilege level is in a supervisor mode. In one embodiment, the processor responsive to the system call instruction is to load one or more segment registers with correct values atomically. In one embodiment, the processor responsive to the system call instruction is to perform validity checks on one or more segment registers atomically. In one embodiment, the processor responsive to the instruction is to perform canonical checks for address conformity atomically on one or more target pointers to be loaded into one or more of the registers.

In various embodiments, the methods of FIGS. 6A-6B may be performed by a general-purpose processor, a special-purpose processor (e.g., a graphics processor or a digital signal processor), or another type of digital logic device or instruction processing apparatus. In some embodiments, the methods of FIGS. 6A-6B may be performed by the instruction processing apparatus 215 of FIG. 2, or a similar processor, apparatus, or system, such as the embodiments shown in FIGS. 7-13. Moreover, the instruction processing apparatus 215 of FIG. 2, as well as the processor, apparatus, or system shown in FIGS. 7-13 may perform embodiments of operations and methods either the same as, similar to, or different than those of the methods of FIGS. 6A-6B.

In some embodiments, the instruction processing apparatus 215 of FIG. 2 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 6C:
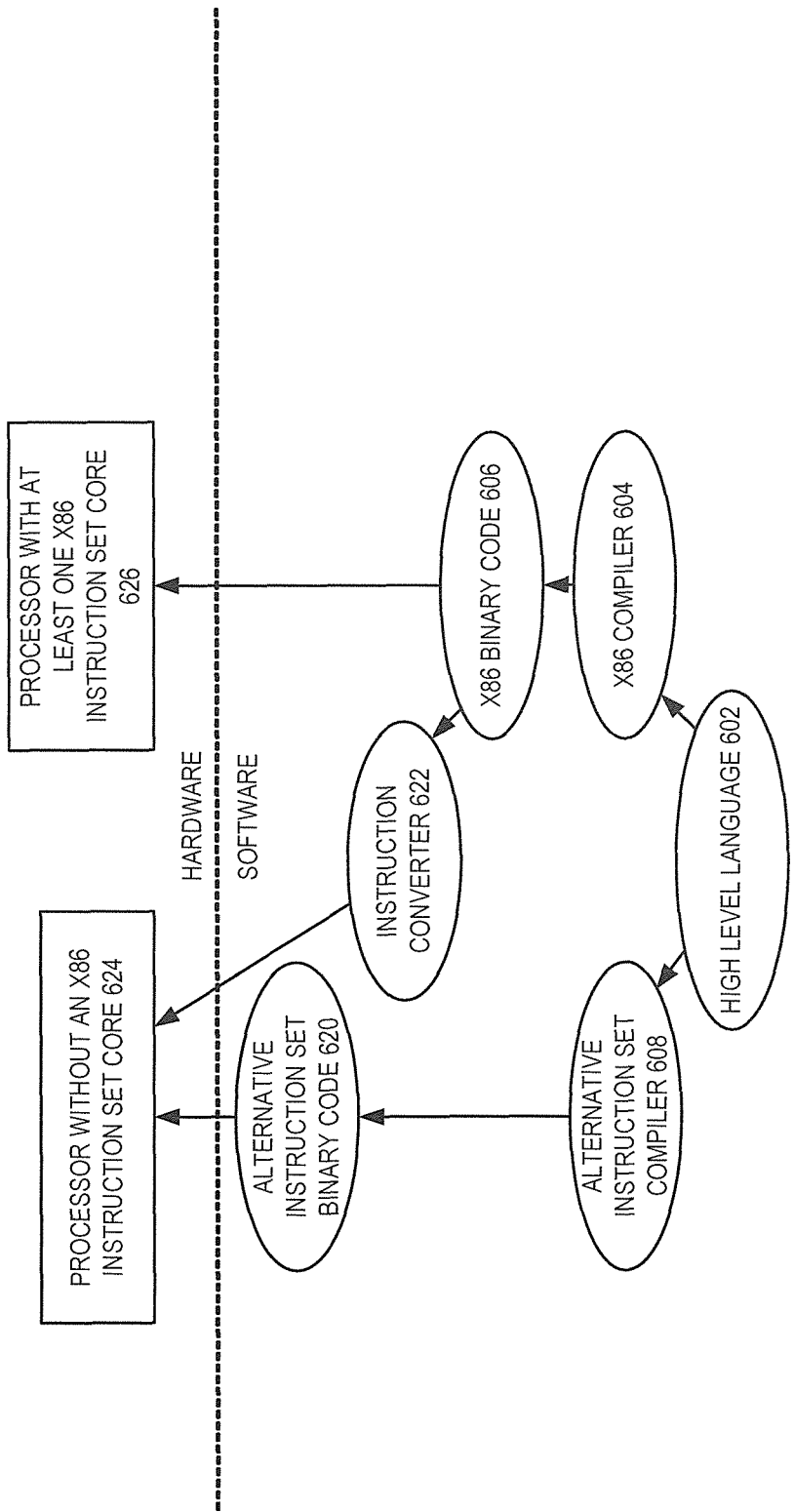
FIG. 6C is a block diagram illustrating the use of a software instruction converter to convert binary instructions in a source instruction set to binary instructions in a target instruction set according to one embodiment.

FIG. 6C is a block diagram contrasting the use of a software instruction converter according to one embodiment. In the illustrated embodiment, the instruction converter is a software instruction converter, although alternatively the instruction converter may be implemented in software, firmware, hardware, or various combinations thereof. FIG. 6C shows a program in a high level language 602 may be compiled using an x86 compiler 604 to generate x86 binary code 606 that may be natively executed by a processor with at least one x86 instruction set core 626. The processor with at least one x86 instruction set core 626 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 626. Similarly, FIG. 6C shows the program in the high level language 602 may be compiled using an alternative instruction set compiler 608 to generate alternative instruction set binary code 620 that may be natively executed by a processor without at least one x86 instruction set core 624 (e.g., a processor with cores that execute the MIPS instruction set of MIPS Technologies of Sunnyvale, Calif. and/or that execute the ARM instruction set of ARM Holdings of Sunnyvale, Calif.). The instruction converter 622 is used to convert the x86 binary code 606 into code that may be natively executed by the processor without an x86 instruction set core 624. This converted code is not likely to be the same as the alternative instruction set binary code 620 because an instruction converter capable of this is difficult to make; however, the converted code will accomplish the general operation and be made up of instructions from the alternative instruction set. Thus, the instruction converter 622 represents software, firmware, hardware, or a combination thereof that, through emulation, simulation or any other process, allows a processor or other electronic device that does not have an x86 instruction set processor or core to execute the x86 binary code 606.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to one embodiment. FIG. 7B is a block diagram illustrating both an exemplary embodiment of an in-order architecture core and an exemplary register renaming, out-of-order issue/execution architecture core to be included in a processor according to one embodiment. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
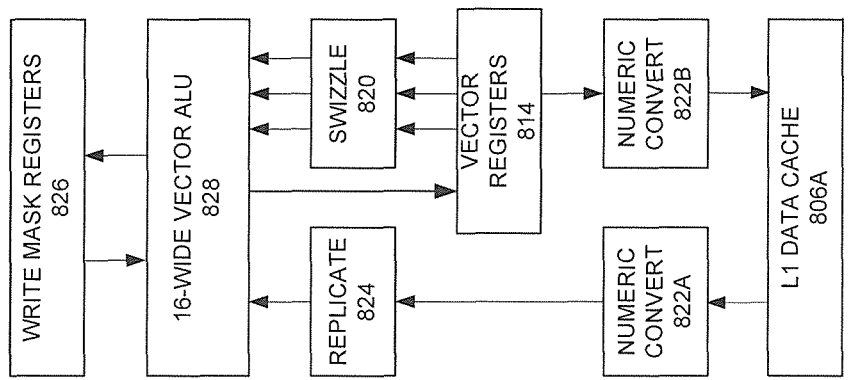
FIGS. 8A-B are block diagrams of a more specific exemplary in-order core architecture according to one embodiment.
Figure 8A:
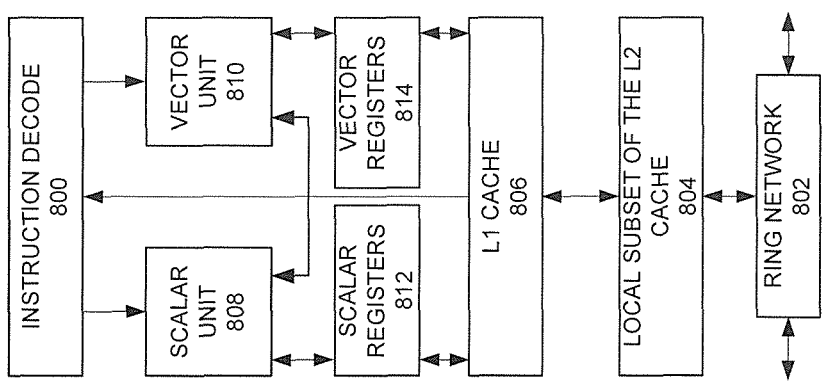

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to one embodiment. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip.

FIG. 8B is an expanded view of part of the processor core in FIG. 8A according to one embodiment. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
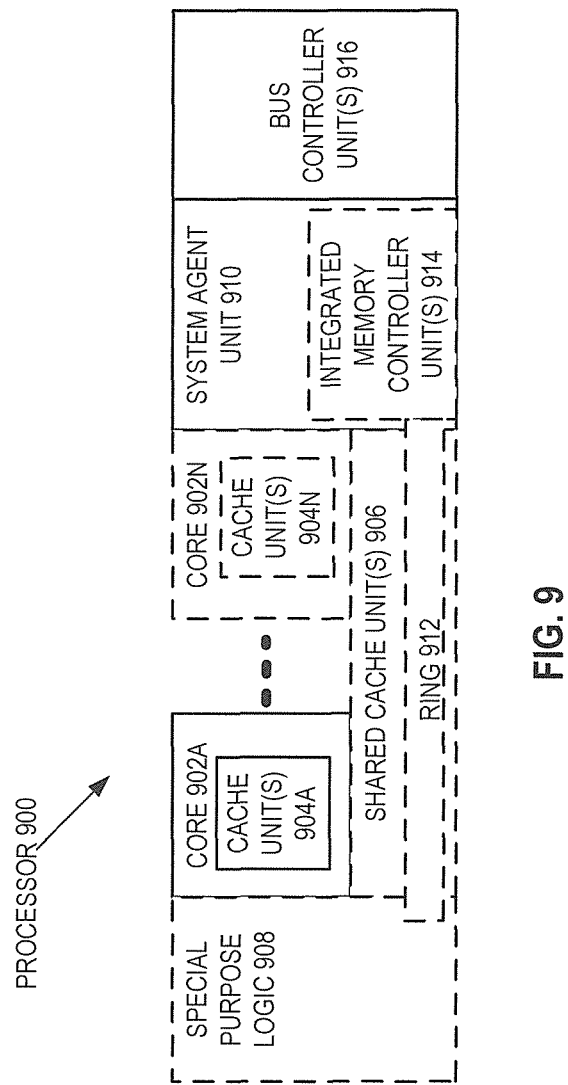
FIG. 9 is a block diagram of a processor according to one embodiment.

FIG. 9 is a block diagram of a processor 900 that may have more than one core, may have an integrated memory controller, and may have integrated graphics according to one embodiment. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
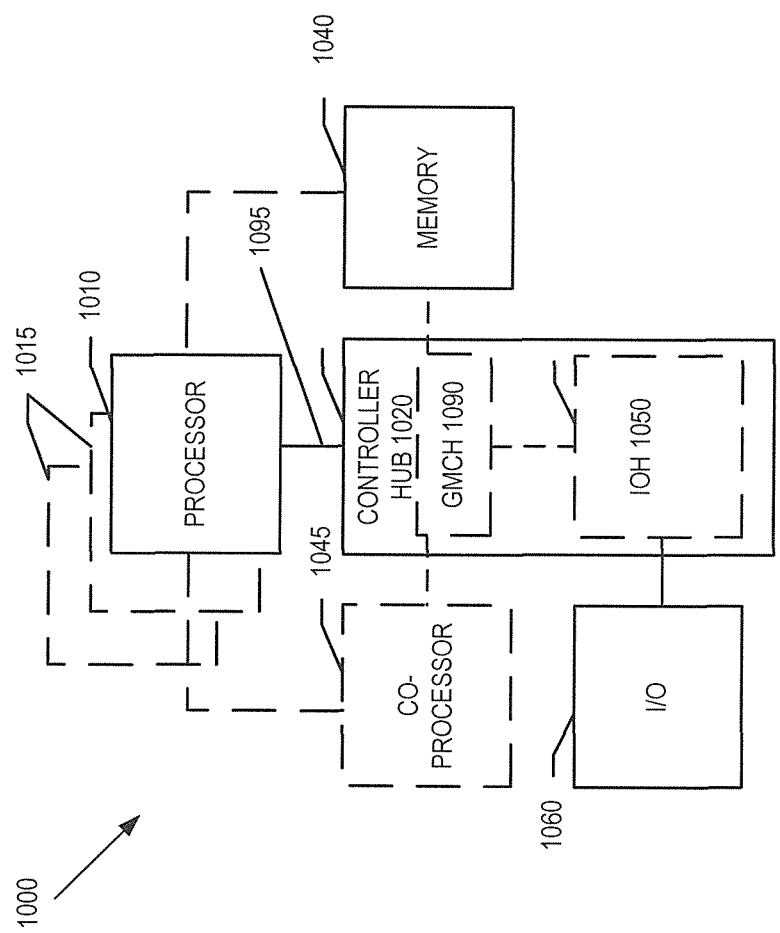
FIG. 10 is a block diagram of a system in accordance with one embodiment.

Referring now to FIG. 10, shown is a block diagram of a system 1000 in accordance with one embodiment. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
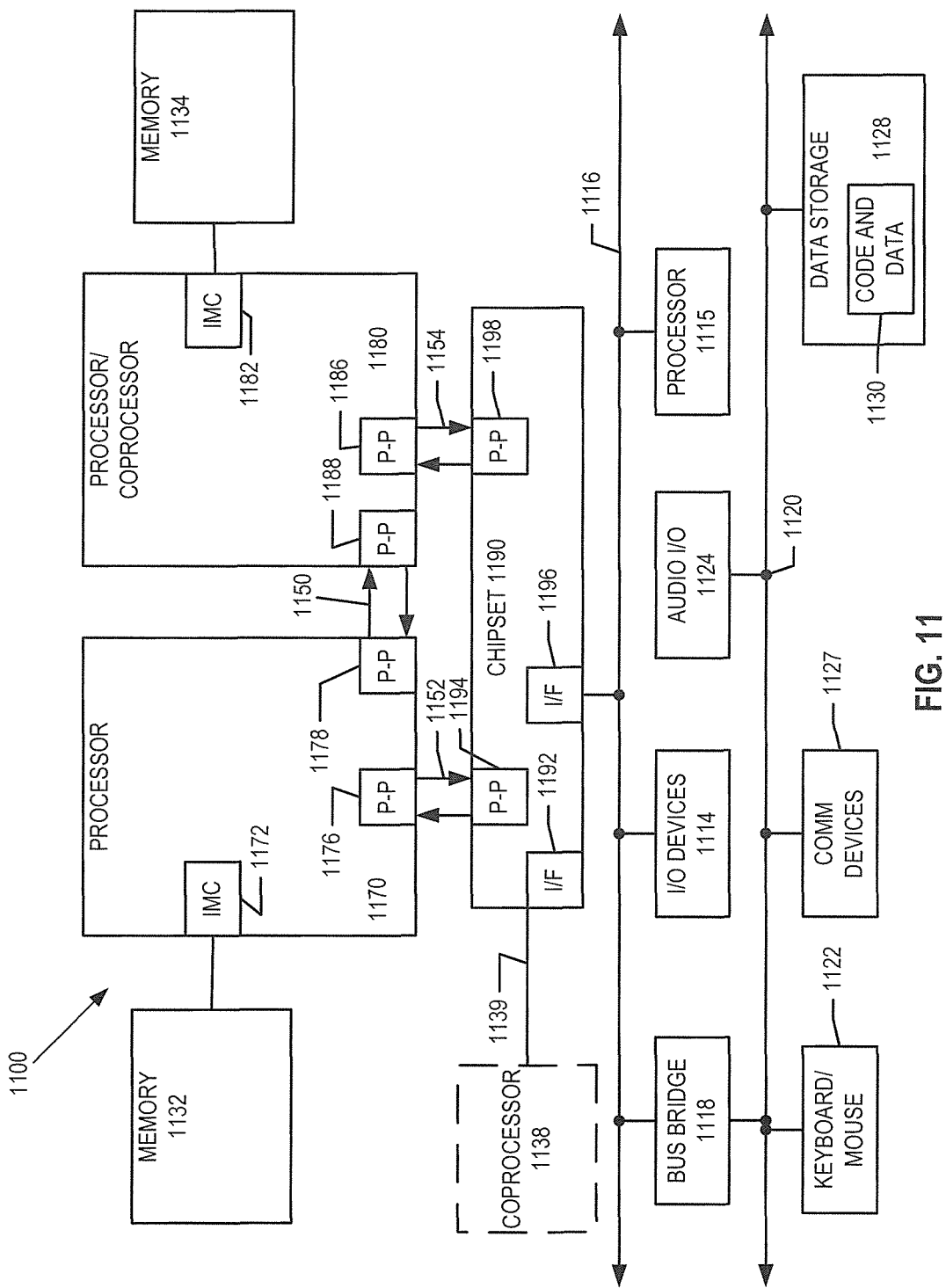
FIG. 11 is a block diagram of a second system in accordance with one embodiment.

Referring now to FIG. 11, shown is a block diagram of a first more specific exemplary system 1100 according to one embodiment. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus. Alternative embodiments may also be used.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
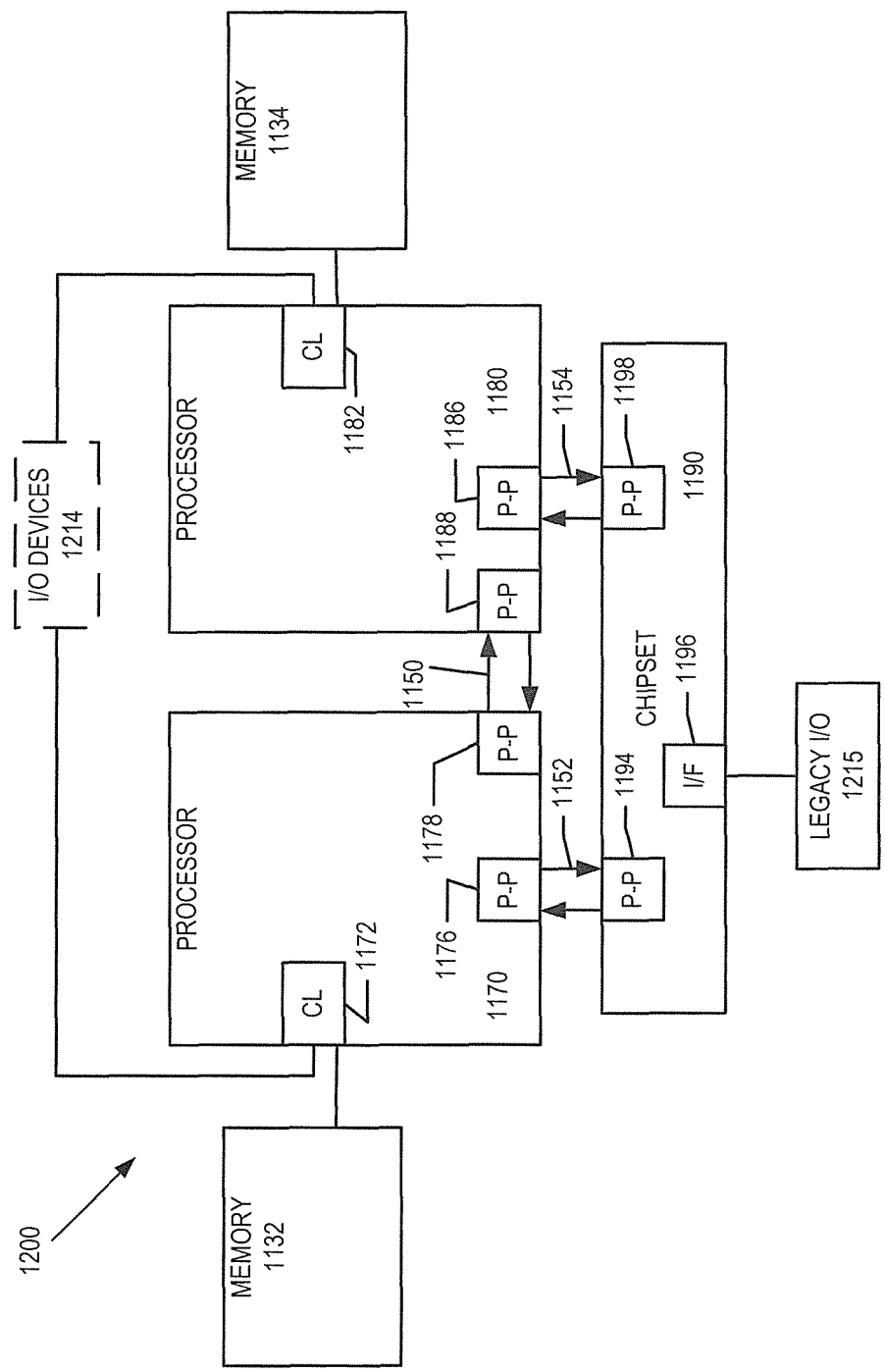
FIG. 12 is a block diagram of a third system in accordance with one embodiment.

Referring now to FIG. 12, shown is a block diagram of a second more specific exemplary system 1200 according to one embodiment. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
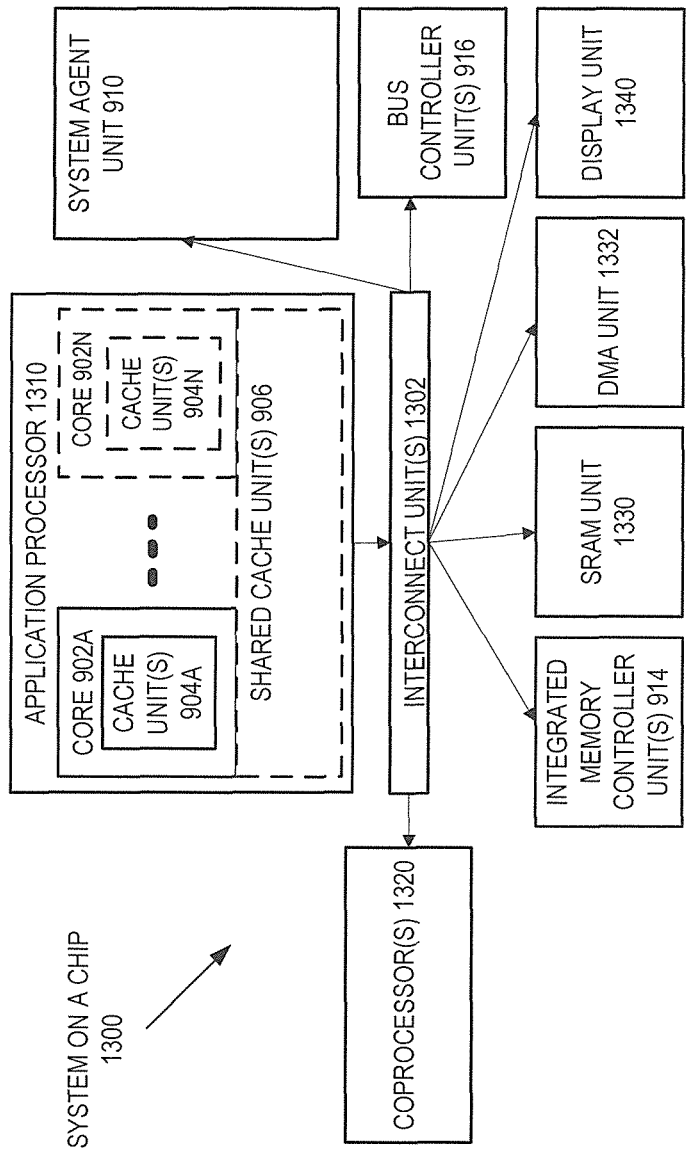
FIG. 13 is a block diagram of a system-on-a-chip (SoC) in accordance with one embodiment.

Referring now to FIG. 13, shown is a block diagram of a SoC 1300 according to one embodiment. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive, and not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a plurality of registers to store pointers to data structures in memory; and
execution circuitry coupled to the registers, the execution circuitry to:
receive a system call instruction from a requester to transfer control from a first privilege level of the requester to a second privilege level of an operating system kernel; and
responsive to the system call instruction, swap the data structures that are pointed to by the registers between the requester and the operating system kernel in one atomic transition.

2. The apparatus of claim 1, wherein the execution circuitry is to receive a system return instruction from the operating system kernel, and to restore control from the operating system kernel to the requester in one atomic transition responsive to the system return instruction.

3. The apparatus of claim 1, wherein the first privilege level is the same as the second privilege level.

4. The apparatus of claim 1, wherein the first privilege level is in a non-supervisor mode and the second privilege level is in a supervisor mode.

5. The apparatus of claim 1, wherein the execution circuitry responsive to the instruction is to load one or more segment registers with correct values atomically.

6. The apparatus of claim 1, wherein the execution circuitry responsive to the instruction is to perform validity checks on one or more segment registers atomically.

7. The apparatus of claim 1, wherein the execution circuitry responsive to the instruction is to perform canonical checks for address conformity atomically on one or more target pointers to be loaded into one or more of the registers.

8. A method comprising:
receiving a system call instruction from a requester to transfer control from a first privilege level of the requester to a second privilege level of an operating system kernel; and
responsive to the system call instruction, swapping data structures that are stored in memory and pointed to by registers between the requester and the operating system kernel in one atomic transition.

9. The method of claim 8, further comprising:
receiving a system return instruction from the operating system kernel; and restoring control from the operating system kernel to the requester in one atomic transition responsive to the system return instruction.

10. The method of claim 8, wherein the first privilege level is the same as the second privilege level.

11. The method of claim 8, wherein the first privilege level is in a non-supervisor mode and the second privilege level is in a supervisor mode.

12. The method of claim 8, further comprising:
loading one or more segment registers with correct values atomically.

13. The method of claim 8, further comprising:
performing validity checks on one or more segment registers atomically.

14. The method of claim 8, further comprising:
performing canonical checks for address conformity atomically on one or more target pointers to be loaded into one or more of the registers.

15. A system comprising:
memory; and
a processor coupled to the memory, the processor comprising:
   a plurality of registers to store pointers to data structures in memory; and
   execution circuitry coupled to the registers, the execution circuitry to:
     receive a system call instruction from a requester to transfer control from a first privilege level of the requester to a second privilege level of an operating system kernel; and
     responsive to the system call instruction, swap the data structures that are pointed to by the registers between the requester and the operating system kernel in one atomic transition.

16. The system of claim 15, wherein the execution circuitry is to receive a system return instruction from the operating system kernel, and to restore control from the operating system kernel to the requester in one atomic transition responsive to the system return instruction.

17. The system of claim 15, wherein the first privilege level is the same as the second privilege level.

18. The system of claim 15, wherein the first privilege level is in a non-supervisor mode and the second privilege level is in a supervisor mode.

19. The system of claim 15, wherein the execution circuitry responsive to the instruction is to load one or more segment registers with correct values atomically, and to perform validity checks on one or more segment registers atomically.

20. The system of claim 15, wherein the execution circuitry responsive to the instruction is to perform canonical checks for address conformity atomically on one or more target pointers to be loaded into one or more of the registers.

* * * * *